(12) United States Patent
Kamijima

(10) Patent No.: US 6,480,355 B1
(45) Date of Patent: Nov. 12, 2002

(54) THIN-FILM MAGNETIC HEAD AND MANUFACTURING METHOD OF THE HEAD

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/357,652

(22) Filed: Jul. 20, 1999

(30) Foreign Application Priority Data

Jul. 30, 1998 (JP) .......................................... 10-228529

(51) Int. Cl.$^7$ .............................. G11B 5/31; G11B 5/39
(52) U.S. Cl. ........................ 360/126; 360/122; 360/317
(58) Field of Search ................................ 360/126, 122, 360/377, 125, 117, 119, 120, 121

(56) References Cited

U.S. PATENT DOCUMENTS

| | | | | |
|---|---|---|---|---|
| 4,970,616 A | * | 11/1990 | Ramaswamy | 360/122 |
| 5,137,750 A | * | 8/1992 | Amin et al. | 427/116 |
| 5,831,801 A | * | 11/1998 | Shouji et al. | 360/126 |
| 5,932,396 A | | 8/1999 | Kamijima | 430/320 |
| 6,072,670 A | * | 6/2000 | Furuichi et al. | 360/126 |
| 6,105,238 A | * | 8/2000 | Chestnutt et al. | 29/603.14 |
| 6,163,436 A | * | 12/2000 | Sasaki et al. | 360/126 |
| 6,172,848 B1 | * | 1/2001 | Santini | 360/126 |
| 6,252,748 B1 | * | 6/2001 | Yamanaka et al. | 360/317 |
| 6,369,984 B1 | * | 4/2002 | Sato et al. | 360/119 |
| 6,381,093 B2 | * | 4/2002 | Yoshida et al. | 360/122 |

* cited by examiner

Primary Examiner—David L. Ometz
Assistant Examiner—Angel Castro
(74) Attorney, Agent, or Firm—Oblon, Spivak, McClelland, Maier & Neustadt, P.C.

(57) ABSTRACT

A thin-film magnetic head has a recording head element that includes a lower magnetic pole, a recording gap, and an upper magnetic pole facing to the lower magnetic pole through the recording gap. The upper magnetic pole has a first width which is constant in a region from a first edge (lower edge) of the upper magnetic pole at the side of the recording gap to a point at a predetermined distance from the first edge, and has a second width at a second edge (upper edge) of the upper magnetic pole at the opposite side of the recording gap. The second width is larger than the first width.

6 Claims, 9 Drawing Sheets

Fig. 5a
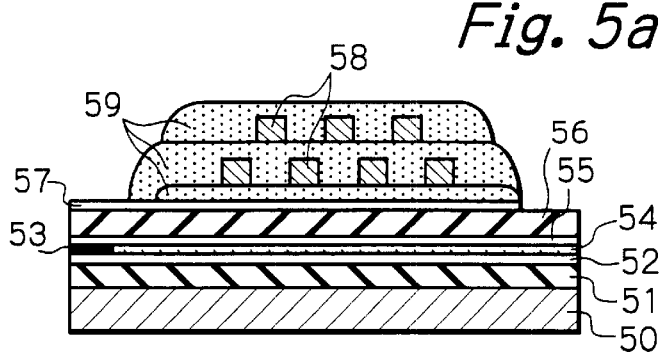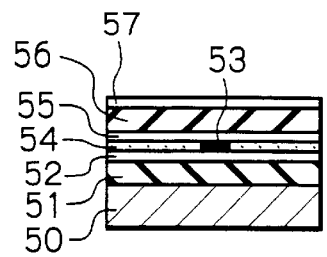
Fig. 5b
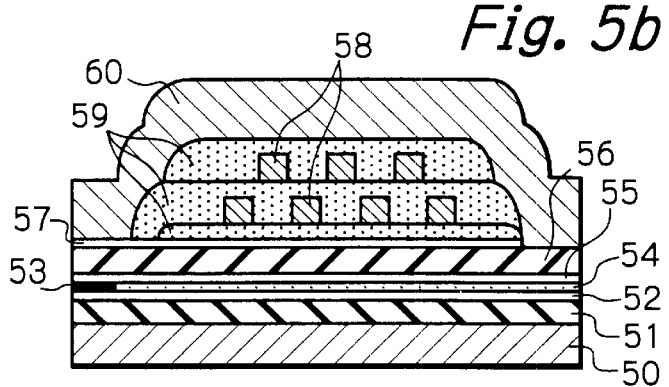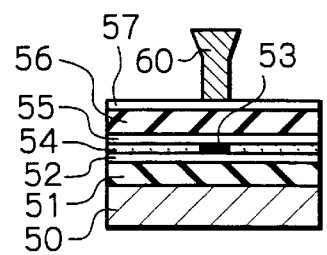
Fig. 5c
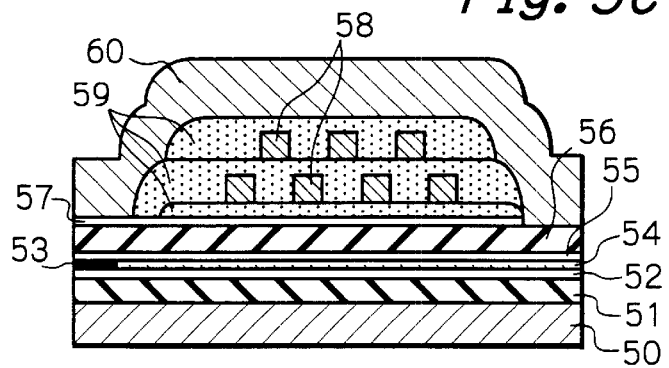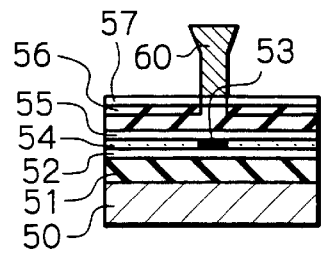
Fig. 5d
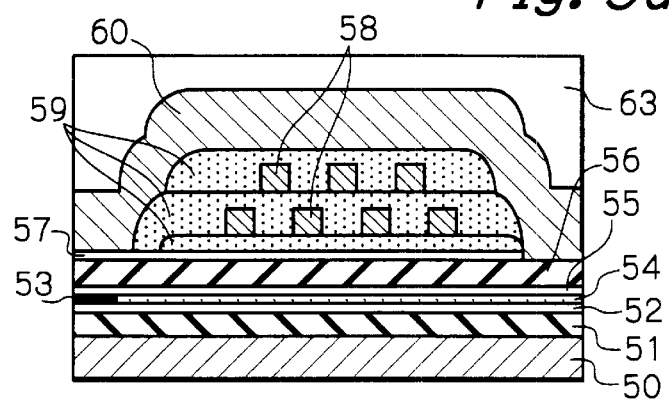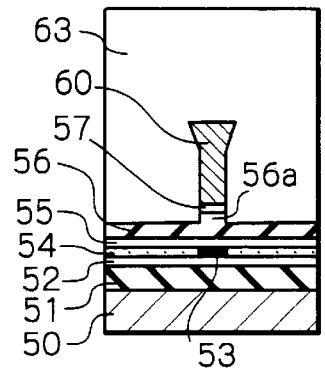

● MAGNETIC HEAD OF THIS EMBODIMENT
○ CONVENTIONAL MAGNETIC HEAD

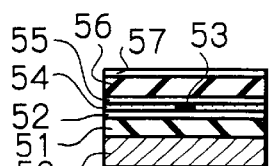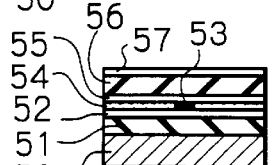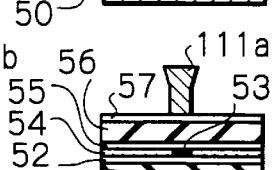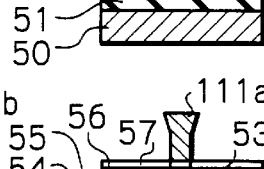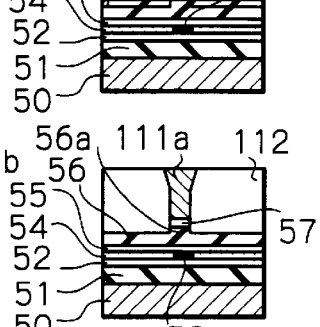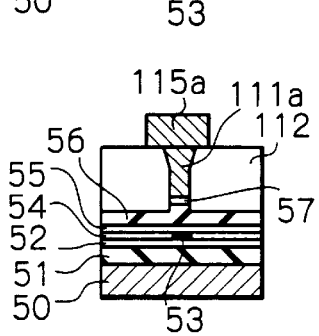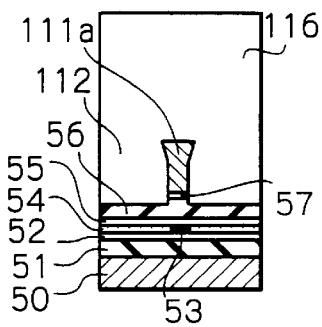

THIN-FILM MAGNETIC HEAD AND MANUFACTURING METHOD OF THE HEAD

FIELD OF THE INVENTION

The present invention relates to a thin-film magnetic head with an inductive recording head element for recording information onto a magnetic media such as a hard disk, a floppy disk and others, and relates to a manufacturing method of such magnetic head.

DESCRIPTION OF THE RELATED ART

An inductive recording head element mainly consists of two magnetic poles and a coil. The magnetic poles are contacted with each other as a yoke at their back-ends. The front edges of the magnetic poles are exposed and face each other through a recording gap at ABS (Air Bearing Surface) side area. The coil is wound on the yoke.

FIGS. 1 and 2 show sectional views seen from ABS side, each illustrating schematic structure of a part of a conventional inductive recording head element.

In FIG. 1, reference numeral 10 denotes a lower magnetic pole, 11 a recording gap, and 12 an upper magnetic pole, respectively. In this inductive recording head element, the upper magnetic pole 12 has the same width $W_{P2}$ at the side of the recording gap 11 and at the opposite side thereof.

The inductive recording head element with such shaped upper magnetic pole 12 has large magnetic resistance due to spreading of magnetic flux around the poles, and hence its overwrite characteristics is relatively degraded.

In order to improve such degradation, another inductive recording head element with an upper magnetic pole shaped as shown in FIG. 2 has been proposed. In this figure, reference numeral 20 denotes a lower magnetic pole, 21 a recording gap, and 22 an upper magnetic pole, respectively. The width $W_{P2}$ of the upper magnetic pole 22 becomes gradually large toward the opposite direction from the recording gap side, and therefore, the cross sectional area of the entrance of magnetic flux flowing is expanded causing the overwrite characteristics to improve.

However, the conventional inductive magnetic head shown in FIG. 2 causes a problem of spreading of effective magnetic track width. Recent requirement for ever increasing of data storage density of magnetic media requires more narrower magnetic track width, therefore this problem is very serious.

SUMMARY OF THE INVENTION

It is therefore an object of the present invention to provide a thin-film magnetic head which can achieve both of narrower track width and more enhanced overwrite characteristics, and to provide a manufacturing method of such head.

According to the present invention, a thin-film magnetic head has a recording head element that includes a lower magnetic pole, a recording gap, and an upper magnetic pole facing to the lower magnetic pole through the recording gap. The upper magnetic pole has a first width which is constant in a region from a first edge (lower edge) of the upper magnetic pole at the side of the recording gap to a point at a predetermined distance from the first edge, and has a second width at a second edge (upper edge) of the upper magnetic pole at the opposite side of the recording gap. The second width is larger than the first width.

In the shape of the upper magnetic pole seen from ABS direction, the width (second width) of the second edge of the upper magnetic pole at the opposite side of the recording gap is larger than that (first width) of the first edge of the upper magnetic pole. Thus, the cross sectional area of the input of magnetic flux flowing becomes larger and that of the output of magnetic flux flowing becomes smaller. As a result, overwrite characteristics is greatly enhanced. Furthermore, since the upper magnetic pole has a constant width in a region from the first edge to a point at a predetermined distance from the first edge, spreading of effective track width of the magnetic head can be effectively avoided.

It is preferred that the first width of the upper magnetic pole is continuously varied from the point to the second edge.

It is also preferred that, in the shape seen from ABS direction, an edge of the lower magnetic pole at the side of the recording gap has a protruded part facing to the upper magnetic pole, and that the protruded part has a width which is equal to the first width at the first edge of the upper magnetic pole.

It is also preferred that, in the shape seen from ABS direction, an edge of the lower magnetic pole at the side of the recording gap is flat.

Preferably, the above-mentioned predetermined distance is equal to or longer than 1 µm.

Also, preferably, the head further has a reproducing head element with a magnetoresistive effect (MR) element. This reproducing head element is integrally stacked with the recording head element.

According to the present invention, also, a method of manufacturing a thin-film magnetic head includes the steps of depositing a layer for a lower magnetic pole, depositing, on the lower magnetic pole layer, a layer for a recording gap, and forming an inductive coil and an upper magnetic pole on the recording gap layer. The upper magnetic pole is formed to have a first width which is constant in a region from a first edge of the upper magnetic pole at the side of the recording gap to a point at a predetermined distance from the first edge, and to have a second width at a second edge of the upper magnetic pole at the opposite side of the recording gap. The upper magnetic pole is shaped so that the second width is larger than the first width.

It is preferred that the upper magnetic pole is formed so that the first width of the upper magnetic pole is continuously varied from the point to the second edge.

It is also preferred that the above-mentioned predetermined distance is equal to or longer than 1 µm.

It is preferred that the forming step includes the step of forming a shape of the upper magnetic pole in a frame plating process which uses a photo resist, and that this shape is controlled by adjusting exposure condition of the photo resist in an exposure step. The exposure condition may be focus point or numerical aperture (NA) in the exposure step.

It is also preferred that the forming step includes the step of dry etching the lower magnetic pole layer by using the upper magnetic pole as a mask so that an edge of the lower magnetic pole at the side of the recording gap has a protruded part facing to the upper magnetic pole, and that the protruded part has a width which is equal to the first width at the first edge of the upper magnetic pole.

Preferably, the method further includes the step of sequentially depositing on a substrate a first shield layer, a shield gap layer and layers for a magnetoresistive effect element, the step of forming the magnetoresistive effect element, the step of depositing a shield gap layer on the magnetoresistive effect element and the step of depositing the lower magnetic pole layer on the shield gap layer.

Further objects and advantages of the present invention will be apparent from the following description of the preferred embodiments of the invention as illustrated in the accompanying drawings.

BRIEF DESCRIPTION OF THE DRAWINGS

FIGS. 5a to 5d show a manufacturing process flow of the thin-film magnetic head in the embodiment shown in FIG. 3;

FIGS. 11a to 11g show a manufacturing process flow of a thin-film magnetic head in a further embodiment according to the present invention.

DESCRIPTION OF THE PREFERRED EMBODIMENTS

Figure 1:
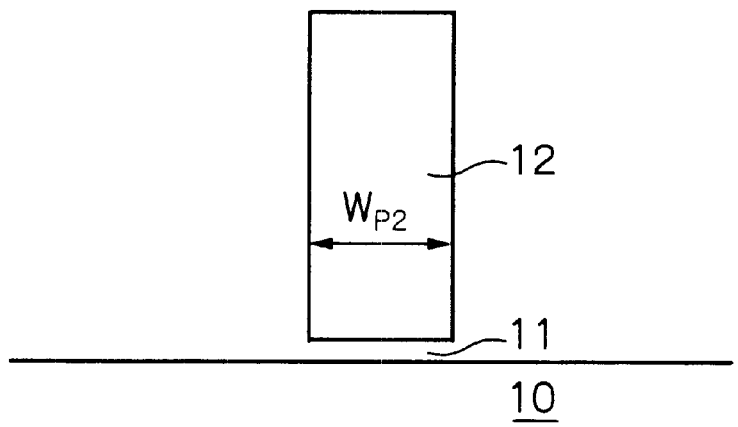
FIG. 1, already described, shows a view illustrating schematic shape of a part of the conventional inductive recording head element seen from ABS side.
Figure 2:
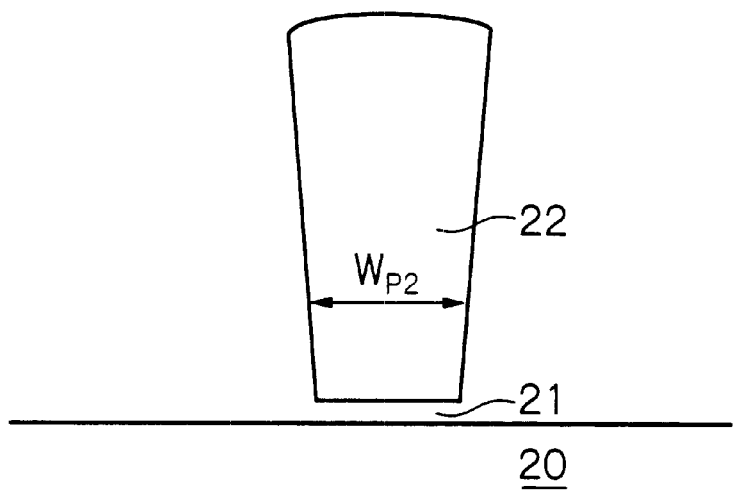
FIG. 2, already described, shows a view illustrating schematic shape of a part of another inductive recording head element seen from ABS side.
Figure 3:
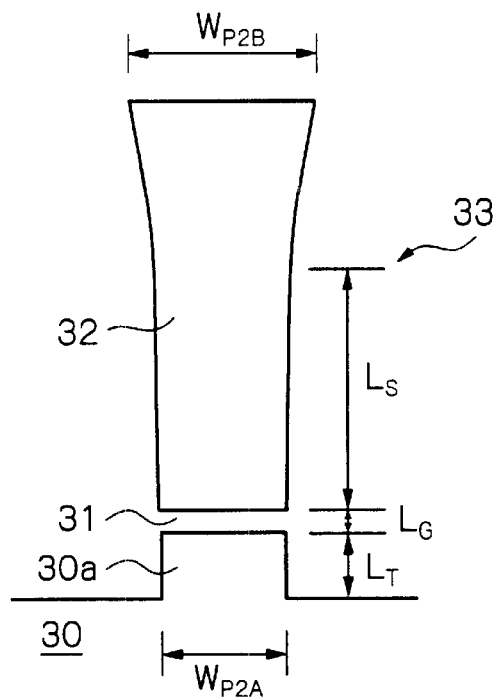
FIG. 3 shows a view illustrating schematic shape of a part of an inductive recording head element seen from ABS side in a preferred embodiment according to the present invention.

FIG. 3 illustrates schematic partial shape of an inductive recording head element seen from ABS side in a preferred embodiment according to the present invention.

In the figure, reference numeral 30 denotes a lower magnetic pole, 31 a recording gap, 32 an upper magnetic pole, and 30a a convex or protruded part of the lower magnetic pole 30, respectively. A lower edge or a recording gap side edge of the upper magnetic pole 32 faces to an upper edge of the protruded part 30a of the lower magnetic pole 30 through the recording gap 31.

The width of the protruded part 30a is constant and equal to $W_{P2A}$. The width of the upper magnetic pole 32 in a region from its lower edge to a specifically defined point 33 located at a distance $L_S$ from the lower edge is also constant and equal to $W_{P2A}$. The width of the upper magnetic pole 32 is gradually increased in a curve from the point 33 to its upper edge and reaches $W_{P2B}$ at the upper edge. Of course, $W_{P2B} > W_{P2A}$.

An example of a set of these parameters is as follows, $W_{P2A}=0.9$ μm, $W_{P2B}=1.5$ μm, $L_G=0.3$ μm, $L_T=0.5$ μm.

Where $L_G$ is the length of the recording gap, and $L_T$ is the length of the protruded part 30a. The specifically defined distance from the lower edge of the upper magnetic pole (hereinafter called as "length of equal-width portion") $L_S$ is selected as $L_S \geq 1.0$ μm.

Figure 4:
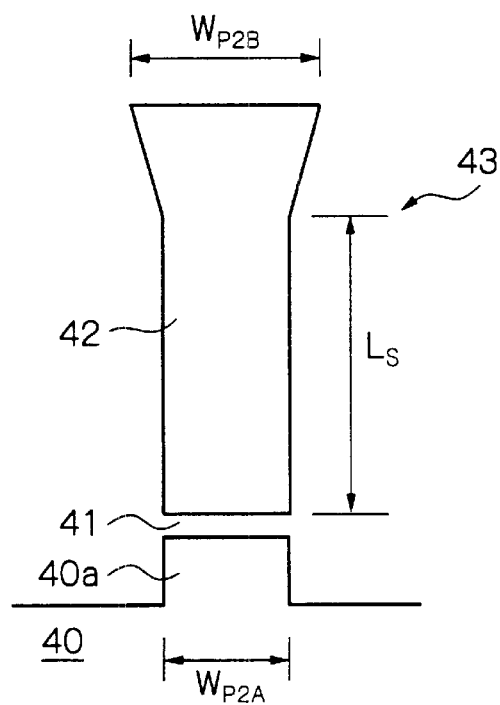
FIG. 4 shows a view illustrating schematic shape of an inductive recording head element in a modification of the embodiment shown in FIG. 3, seen from ABS side.

As shown in FIG. 3, the width of the upper magnetic pole 32 is gradually increased in a curve from the point 33 to the upper edge. In a modification, the width of the upper magnetic pole 32 may be linearly increased from the point 33 to the upper edge as shown in FIG. 4. In this figure, reference numeral 40 denotes a lower magnetic pole, 41 a recording gap, 42 an upper magnetic pole, and 40a a protruded part of the lower magnetic pole 40, respectively. The lower edge of the upper magnetic pole 42 faces to the upper edge of the protruded part 40a of the lower magnetic pole layer 40 through the recording gap 41. The width of the protruded part 40a is constant and equal to $W_{P2A}$. The width of the upper magnetic pole 42 in a region from its lower edge to a specifically defined point 43 located at a distance $L_S$ from the lower edge is also constant and equal to $W_{P2A}$. The width of the upper magnetic pole 42 is linearly increased from the point 43 to its upper edge and reaches $W_{P2B}$ at the upper edge. Of course, $W_{P2B} > W_{P2A}$.

FIGS. 5a to 5d illustrate manufacturing processes of a thin-film magnetic head in the embodiment shown in FIG. 3. These figures show cross sectional views of the magnetic head along the centerline of the recording track and cross sectional views of the magnetic head seen from ABS side. This embodiment relates to a hybrid type thin-film magnetic head with an inductive recording head element and a MR reproducing head element that are integrally stacked. Of course, the present invention can be applied to a thin-film magnetic head that consists of only an inductive recording head element.

First, on a substrate (not shown) made of ceramic material such as AlTiC and others, an insulation layer 50 is formed. The insulation layer 50 is made of $Al_2O_3$, $SiO_2$ or others, and is deposited preferably with a thickness of about 1000–20000 nm by sputtering or other methods.

Then, on the insulation layer 50, a lower shield layer 51 is formed, and on the lower shield layer 51, an insulation layer 52 for a shield gap layer is formed. The lower shield layer 51 is made of FeAlSi, NiFe, CoFe, CoFeNi, FeN, FeZrN, FeTaN, CoZrNb, CoZrTa or others, and is deposited preferably with a thickness of about 100–5000 nm by sputtering or plating or other methods. The shield gap insulation layer 52 is made of $Al_2O_3$, $SiO_2$ or others, and is deposited preferably with a thickness of about 10–200 nm by sputtering or other methods.

Then, a MR element 53 is formed on the insulation layer 52, and also lead conductors 54 for electrical connection across the MR element 53 are formed.

The MR element 53 can be formed by a single layered structure of magnetic material, but preferably it is formed by a multi-layered structure of alternatively stacked magnetic and non-magnetic materials. As for the magnetic material, NiFe, NiFeRh, FeMn, NiMn, Co, Fe, NiO, NiFeCr or others may be preferably used, and as for the non-magnetic material, Ta, Cu, Ag or others may be preferably used. As for the multi-layered structure, a stacked structure of three layers such as NiFeRh/Ta/NiFe, or a stacked structure of multi-layers such as NiFe/Cu/NiFe/FeMN, NiFe/Cu/Co/FeMn, Cu/Co/Cu/NiFe, Fe/Cr, Co/Cu, Co/Ag or others, can be used. In a modification, a plurality of stacked units, each of which consists of the above-mentioned stacked structure, can be used as for the multi-layered structure.

In case of the multi-layered structures, a thickness of the magnetic material layer is preferably in a range of about 0.5–50 nm, more preferably in a range of about 1–25 nm, and a thickness of the non-magnetic material layer is preferably in a range of about 0.5–50 nm, more preferably in a range of about 1–25 nm. The number of the stacked units to be repeatedly stacked is preferably in a range of 1–30, more preferably in a range of 1–20. The total thickness of the MR element 53 is preferably in a range of about 5–100 nm, more preferably in a range of about 10–60 nm.

Each layers of the MR element is deposited by sputtering, plating or other methods. The lead conductors 54 are made of W, Cu, Au, Ag, Ta, Mo, CoPt or others, and is deposited preferably with a thickness of about 10–500 nm, more preferably with a thickness of about 50–300 nm, by sputtering, plating or other methods.

After this process, a shield gap insulation layer 55 is deposited on the MR element 53 and on the lead conductors 54. This insulation layer 55 is made of $Al_2O_3$, $SiO_2$ or others, and is deposited, by sputtering or other methods, preferably with a thickness of about 5–500 nm, more preferably with a thickness of about 10–200 nm.

Each layer of the MR reproducing head element is patterned by usual lift-off method using resist patterns, ion milling method or their combined method.

Then, a magnetic material is deposited to form a layer which serves as both of an upper shield layer of the MR element 53 and a lower magnetic pole 56 of the recording head element, and on the deposited layer, an insulation material is deposited to form a recording gap 57.

The layer for the lower magnetic pole 56 is made of soft magnetic material such as NiFe, CoFe, CoFeNi, FeN or others, and is deposited with a proper thickness of about 500–4000 nm by plating method, sputtering method or other methods. The insulation layer for the recording gap 57 is made of $Al_2O_3$, $SiO_2$, or others, and is deposited with a thickness of about 10–500 nm.

Thereafter, on the recording gap 57, a coil 58 and an insulation layer 59 for embedding the coil 57 are formed. The coil 58 is made of a conducting material such as Cu, and formed with a thickness of about 2000–5000 nm by frame plating method or other methods. The insulation layer 59 is formed by hot cured photo-resist material with a thickness of about 3000–20000 nm.

The multi-layered structure of the thin-film magnetic head after the processes described above is shown in FIG. 5a. The coil 58 can be formed in a two layer configuration as shown in the figure, in a three or more layer configuration, or of course in a single layer configuration.

Then, as shown in FIG. 5b, an upper magnetic pole 60 which has a magnetic pole portion at ABS side and a backside magnetic yoke portion is formed on the insulation layer 59 by frame plating method. The upper magnetic pole 60 is made of a soft magnetic material such as NiFe, CoFe, CoFeNi, FeN or others, and is deposited preferably with a thickness of about 3000–5000 nm. At this process, the shape of the magnetic pole portion of the upper magnetic pole 60 seen from ABS side is structured as shown in FIG. 3 or FIG. 4.

Hereinafter, a frame plating method used for formation of the upper magnetic pole 60 is described. FIGS. 6a to 6f illustrate a detail manufacturing processes of forming such upper magnetic pole by the frame plating method in this embodiment.

Figure 6A:
FIGS. 6a to 6f show a detail manufacturing process flow of formation of an upper magnetic pole by frame plating in the embodiment shown in FIG. 3.
Figure 6B:
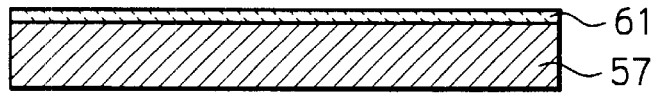

On the recording gap 57 shown in FIG. 6a, a low resistance thin-film 61 which is preferably made of the same material as that used in the following frame plating, such as Cu, NiFe, Au or others, is deposited with a thickness of about 10–500 nm as shown in FIG. 6b.

Figure 6C:
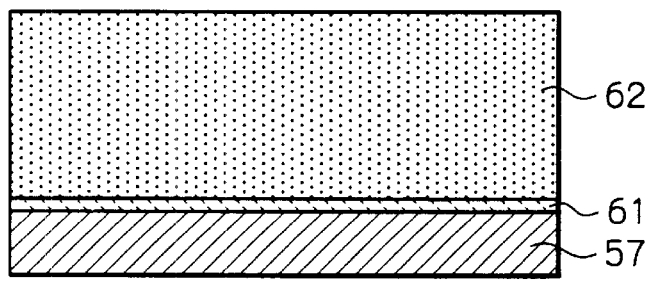
Figure 6D:
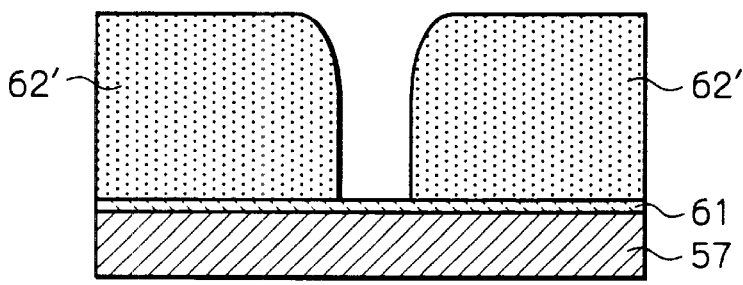

Then, as shown in FIG. 6c, a resist layer 62 is formed on the low resistance thin-film 61. At this process, the thickness of the resist layer 62 is adjusted to become larger than that of the plated layer. Thereafter, as shown in FIG. 6d, a mask pattern is transferred on the resist layer 62 by photo-exposure and then the transferred pattern is developed. By properly adjusting the condition of the photo-exposure onto the resist layer 62, the shape of the upper magnetic pole shown in FIG. 3 or FIG. 4 can be obtained.

FIGS. 7a to 7f illustrate shape control of the pattern of a resist 62' by adjusting focus point in the photo-exposure process. In these figures, values of the vertical axis represent height of the resist ($\mu$m), and hatched areas indicate the resist left after the development.

Figure 7A:
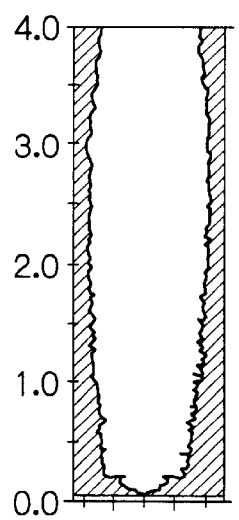
FIGS. 7a to 7f illustrate shape control of resist pattern by adjusting focus point in photo-exposure process.
Figure 7B:
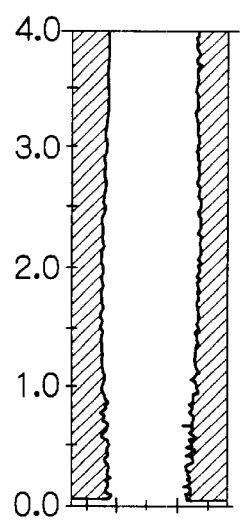
Figure 7C:
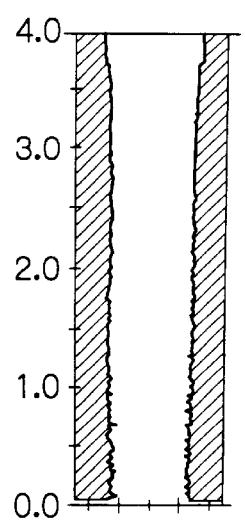
Figure 7D:
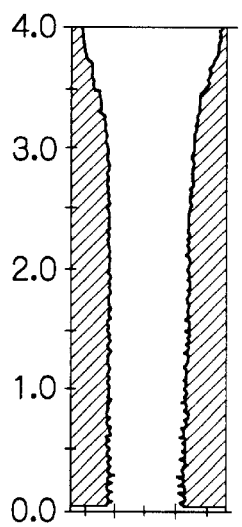
Figure 7E:
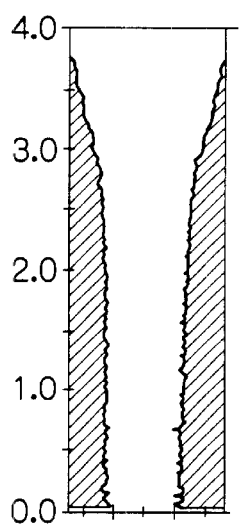
Figure 7F:
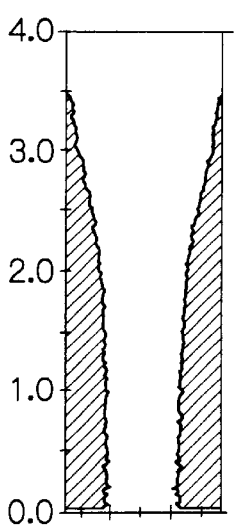

FIG. 7a is the case where the focus point locates at a height of 5.0 $\mu$m from the substrate surface, FIG. 7b is the case where the focus point locates at a height of 4.0 $\mu$m from the substrate surface, FIG. 7c is the case where the focus point locates at a height of 3.0 $\mu$m from the substrate surface, FIG. 7d is the case where the focus point locates at a height of 2.0 $\mu$m from the substrate surface, FIG. 7e is the case where the focus point locates at a height of 1.0 $\mu$m from the substrate surface, and FIG. 7f is the case where the focus point locates at a height of 0.0 $\mu$m from the substrate surface, namely at the substrate surface, respectively.

It is apparent from these figures, by adjusting the focus point of the photo-exposure of the resist layer 62 with respect to the mask pattern, desired shapes of the resist after development can be obtained. In stead of adjusting the focus point of the photo-exposure as aforementioned, adjustment of numerical aperture (NA) of the exposure optical system will give similar results.

Figure 6E:
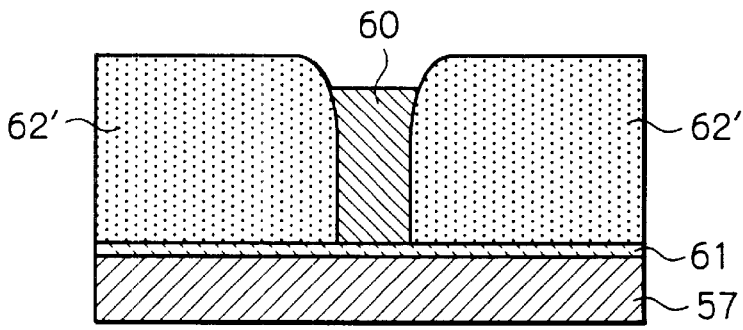
Figure 6F:
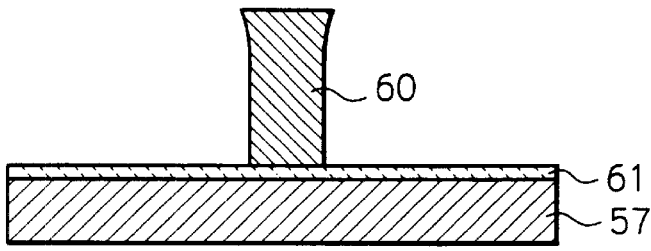

Then, as shown in FIG. 6e, a soft magnetic material such as NiFe, CoFe, CoFeNi, FeN or others is plated through thus patterned resist 62', and the upper magnetic pole 60 is formed. After this process, as shown in FIG. 6f, the patterned resist 62' is removed by proper organic solvent solution.

In modification, the upper magnetic pole 60 can be formed by a dry process which is constituted by combining the sputtering method and the ion milling method, instead of the previously described frame plating method.

Thereafter, as shown in FIG. 5c, by using thus formed upper magnetic pole 60 as a mask, dry etching such as ion milling, RIE (Reactive Ion Etching) or others is implemented so that an area, uncovered by the mask, of the low resistance thin-film 61 and the insulation layer for the recording gap 57 are removed and over milling or etching is done into the uncovered area of the magnetic layer for the lower magnetic pole 56.

By this process implementation, under the lower edge of the upper magnetic pole 60, a protruded part 56a which faces to the lower edge of the upper magnetic pole 60 through the recording gap 57 and has the same width as that of the lower edge of this upper magnetic pole 60 is formed at the lower magnetic pole 56 as shown in FIG. 5d. Then, pad bumps and others are formed, and after that, a protection layer 63 is deposited. This protection layer 63 is made of insulation material such as $Al_2O_3$, $SiO_2$ or others, and is deposited preferably with a thickness of about 5000–50000 nm by sputtering or other methods.

As aforementioned with reference to FIG. 3, according to this embodiment, the width of the upper magnetic pole 32 (60) in a region from its lower edge to a specifically defined point located at a distance $L_S$, from the lower edge is constant and equal to $W_{P2A}$, and the width of the upper magnetic pole 32 (60) is gradually increased in a curve from the point to its upper edge having the width of $W_{P2B}$ which is larger than $W_{P2A}$. When the length of this equal-width portion $L_S$ is selected as $L_S \geq 1.0$ μm, the effective track width of the magnetic head does not spread.

Figure 8:
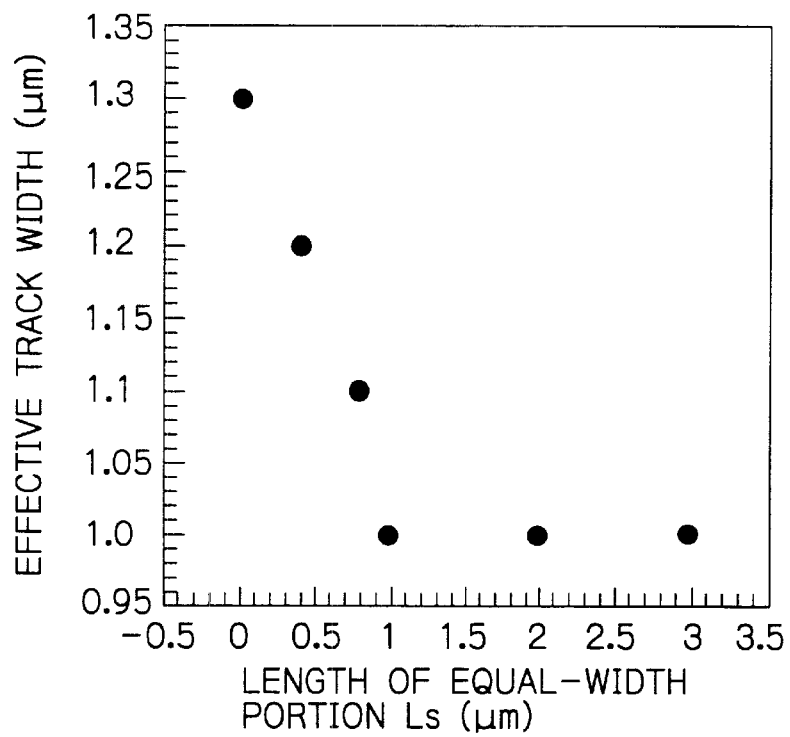
FIG. 8 shows a relationship between the length of equal-width portion $L_S$ of the upper pole and the effective track width.
Figure 9:
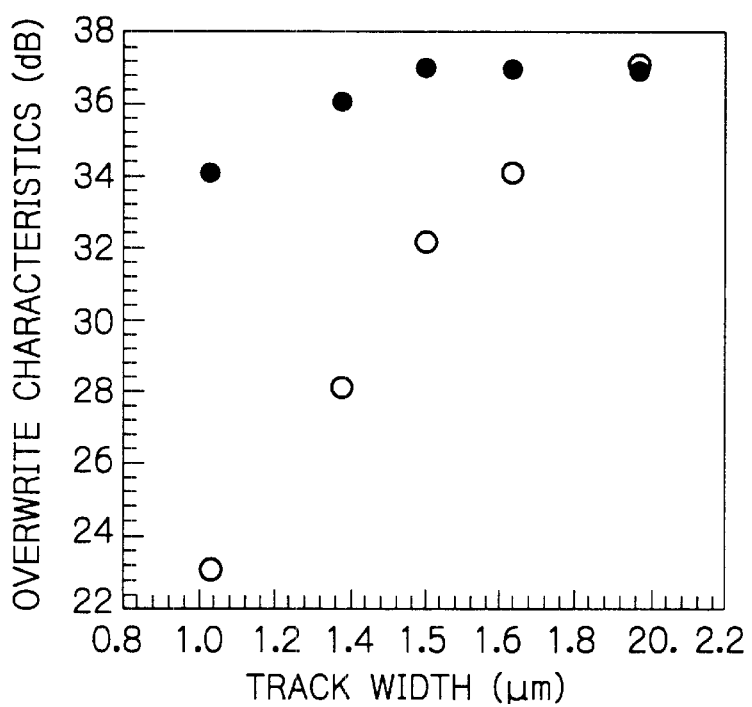
FIG. 9 shows a relationship between the track width and the overwrite characteristics in the embodiment shown in FIG. 3.

FIG. 8 shows a relationship between the length of equal-width portion $L_S$ of the upper pole and the effective track width. This relationship is obtained when the width of the lower edge of the upper magnetic pole is $W_{P2A}=0.9$ μm, the width of the upper edge of the upper magnetic pole is $W_{P2A}=1.5$ μm, the length of the recording gap is $L_G=0.3$ μm, and the length of the protruded part of the lower magnetic pole is $L_T=0.5$ μm. FIG. 9 shows a relationship between the track width and the overwrite characteristics.

As will be apparent from FIG. 8, when the length of the equal-width portion $L_S$ is equal to or longer than 1.0 μm, the effective track width can be kept near 1.0 μm. But if the length of the equal-width portion $L_S$ is shorter than 1.0 μm, the effective track width remarkably spreads.

As will be understood from FIG. 9, the magnetic head in this embodiment can maintain good overwrite characteristics by the widened upper edge of the upper magnetic pole, even when the recording track width is narrowed. On the contrary, in the conventional magnetic head wherein the width of the upper magnetic pole is constant along its whole length, the overwrite characteristics is drastically degraded, when the recording track width is narrowed.

Therefore, according to this embodiment, since the width of the upper edge of the upper magnetic pole $W_{P2B}$ is widened than that of the lower edge of the upper magnetic pole $W_{P2A}$, and the length of the equal-width portion $L_S$ is adjusted to be equal to or more than 1.0 μm, both of narrowed recording track width and enhanced overwrite characteristics can be achieved.

Figure 10A:
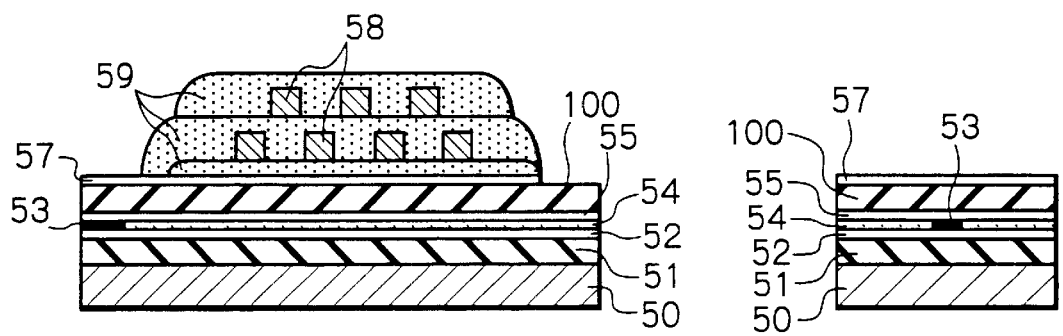
FIGS. 10a to 10c show a manufacturing process flow of a thin-film magnetic head in another embodiment according to the present invention.
Figure 10B:
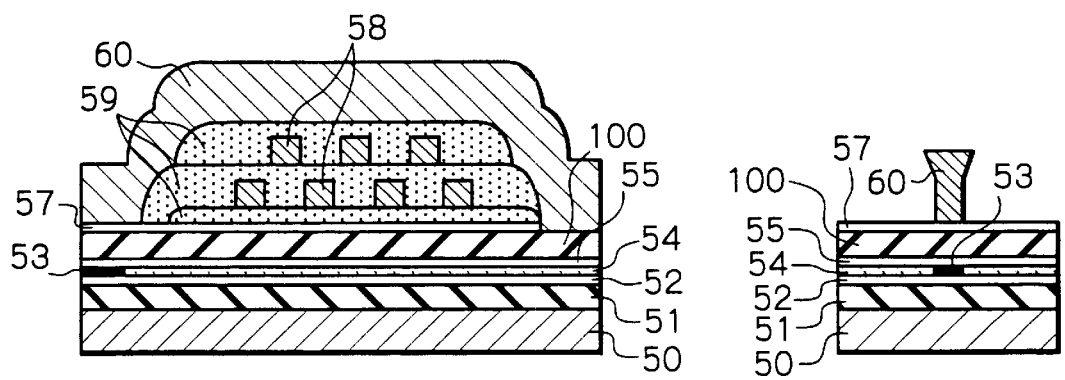
Figure 10C:
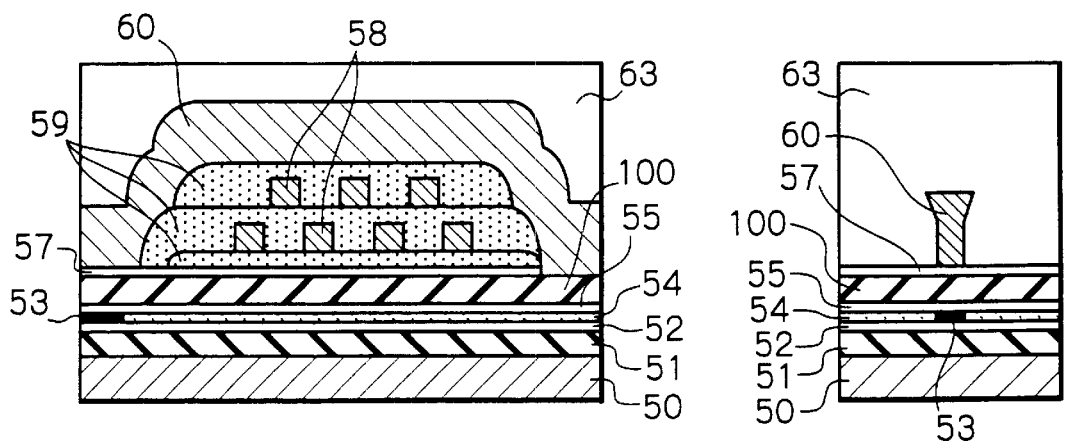

FIGS. 10a to 10c illustrate manufacturing processes of a thin-film magnetic head in another embodiment according to the present invention. These figures show cross sectional views of the magnetic head along the centerline of the recording track and cross sectional views of the magnetic head seen from ABS side. This embodiment relates to a hybrid type thin-film magnetic head with an inductive recording head element and a MR reproducing head element, which are integrally stacked.

In the previous embodiment shown in FIG. 3, the lower magnetic pole has a protruded part 30a, which faces the lower edge of the upper magnetic pole. Whereas, in this embodiment, the upper edge of the lower magnetic pole has a flat shape.

In this embodiment, the manufacturing processes for forming an insulation layer 50 on a substrate, a lower shield layer 51, an insulation layer 52 for a shield gap, a MR element 53, lead conductors 54, an insulation layer 55 for a shield gap, a magnetic layer for a lower magnetic pole 100, an insulation layer for a recording gap 57, a coil 58, and an insulation layer 59 for embedding the coil 58 are just same as those illustrated already with reference to FIG. 5a. A semi-finished structure by those processes is shown in FIG. 10a.

Then, as shown in FIG. 10b, an upper magnetic pole 60, which has a magnetic pole portion at ABS side and a backside magnetic yoke portion is formed on the insulation layer 59 by frame plating method. The manufacturing processes forming the upper magnetic pole 60 are also just same as those described with reference to FIG. 5b.

After that, according to this embodiment, without milling into the magnetic layer for the lower magnetic pole 100, pad bumps and others are formed as shown in FIG. 10c, and then, a protection layer 63 is deposited. As will be noted, in this embodiment, except for having a flattened upper edge of the lower magnetic pole at the side of the recording gap, almost the same processes are implemented as those in the embodiment shown in FIG. 3.

Other structures, operations, advantages and modifications in this embodiment are almost the same as those in the previously described embodiment shown in FIG. 3.

FIGS. 11a to 11g illustrate manufacturing processes of a thin-film magnetic head in a further embodiment according to the present invention. These figures show cross sectional views of the magnetic head along the centerline of recording track and cross sectional views of the magnetic head seen from ABS side. This embodiment relates also to a hybrid type thin-film magnetic head with an inductive recording head element and a MR reproducing head element, which are integrally stacked.

In the previous embodiment shown in FIG. 3, the magnetic pole portion and the yoke portion of the upper magnetic pole are simultaneously formed by the same frame plating process. However, in this embodiment, the pole portion and the yoke portion are separately formed by different independent processes.

In this embodiment, the manufacturing processes for forming an insulation layer 50 on a substrate, a lower shield layer 51, an insulation layer 52 for a shield gap, a MR element 53, lead conductors 54, an insulation layer 55 for a shield gap, a magnetic layer for a lower magnetic pole 56, and an insulation layer for a recording gap 57 are Just same as those illustrated already with reference to FIG. 5a. A semi-finished structure by those processes is shown in FIG. 11a.

Then, as shown in FIG. 11b, an insulation bump 110 to decide throat height is formed on the insulation layer for the recording gap 57. However, the insulation bump 110 is not necessarily needed.

Then, as shown in FIG. 11c, a magnetic pole portion 111a and a back-end yoke portion 111b of an upper magnetic pole are formed by the frame plating method, respectively. This manufacturing process, except for the magnetic pole portion 111a and the back-end yoke portion 111b, is just same as that described with reference to FIG. 5b.

Thereafter, as shown in FIG. 11d, using thus formed pole portion 111a of the upper magnetic pole as a mask, dry etching such as ion milling, RIE (Reactive Ion Etching) or others is implemented so that an area, uncovered by the mask, of the low resistance thin-film deposited at the frame plating process and the insulation layer for the recording gap 57, which are removed and over milling or etching is done into the uncovered area of the magnetic layer for the lower magnetic pole 56.

By this process implementation, under the lower edge of the upper magnetic pole portion 111a, a protruded part 56a which faces to the edge of the upper magnetic pole through the recording gap 57 and has the same width as that of the lower edge of this upper magnetic pole is formed at the lower magnetic pole 56 as shown in FIG. 11e. Then, a non-magnetic insulation layer 112 made of an insulation material such as $Al_2O_3$ or others is deposited for planarization. Then, Chemical Mechanical Polishing (CMP) is done until the heights of the magnetic pole portion 111a and the back-end yoke portion 111b of the upper magnetic pole reach to a specified value.

Then, as shown in FIG. 11f, a coil 113 and an insulation layer 114 for embedding the coil 113 are formed on the insulation layer 112 as well as in the case shown in FIG. 5a, and a yoke portion 115 of the upper magnetic pole is formed on the insulation layer 114. This yoke portion 115 connects the previously formed magnetic pole portion 111a and back-end yoke portion 111b so as to finally accomplish the upper magnetic pole.

The front-end part (ABS side) of the yoke portion 115 is formed as an auxiliary magnetic pole portion 115a on the magnetic pole portion 111a so as to contact with the portion 111 as shown in FIG. 11f. The width of the auxiliary magnetic pole portion 115a is equal to or larger than that of the upper edge of the magnetic pole portion 111a. It is preferred that the auxiliary magnetic pole portion 115a is not extended to ABS. However, when the auxiliary magnetic pole portion 115a is extended to ABS, it is desired to form the portion 115a to have a shape seen from the ABS so that its width gradually and continuously increases from that of the upper edge of the magnetic pole portion 111a.

After that, pad bumps are formed, and then a protection layer 116 is deposited as shown in FIG. 11g.

Other structures, operations, advantages and modifications in this embodiment are almost the same as those in the previously described embodiment shown in FIG. 3.

FIGS. 12a to 12f illustrate manufacturing processes of a thin-film magnetic head in a still further embodiment according to the present invention. These figures show cross sectional views of the magnetic head along the centerline of recording track and cross sectional views of the magnetic head seen from ABS side. This embodiment relates also to a hybrid type thin-film magnetic head with an inductive recording head element and a MR reproducing head element, which are integrally stacked.

In the previous embodiment shown in FIGS. 11a to 11g, the lower magnetic pole has a protruded part 56a, which faces the lower edge of the upper magnetic pole. Whereas, in this embodiment, the upper edge of the lower magnetic pole has a flat shape.

Figure 12A:
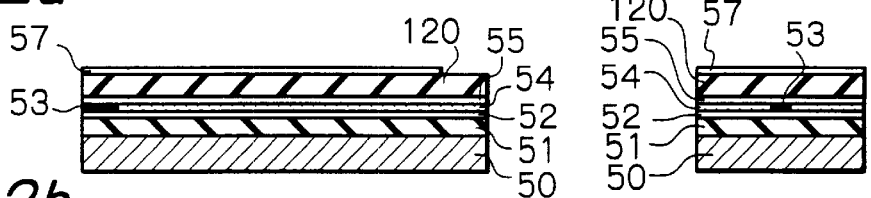
FIGS. 12a to 12f show a manufacturing process flow of a thin-film magnetic head in a still further embodiment according to the present invention.
Figure 12B:
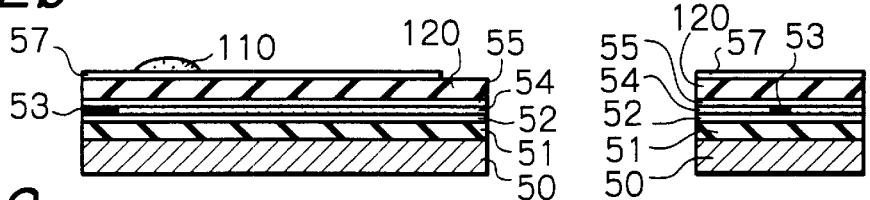
Figure 12C:
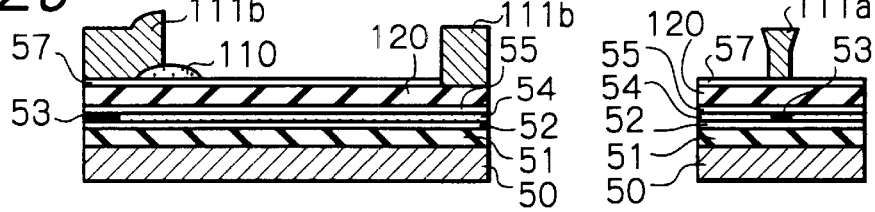

In this embodiment, the manufacturing processes for forming an insulation layer 50 on a substrate, a lower shield layer 51, an insulation layer 52 for a shield gap, a MR element 53, lead conductors 54, an insulation layer 55 for a shield gap, a magnetic layer for a lower magnetic pole 120, an insulation layer for a recording gap 57, and a magnetic pole portion 111a and a back-end yoke portion 111b of an upper magnetic pole are just same as those illustrated already with reference to FIGS. 11a to 11g. A semi-finished structure by those processes is shown in FIG. 12c.

Figure 12D:
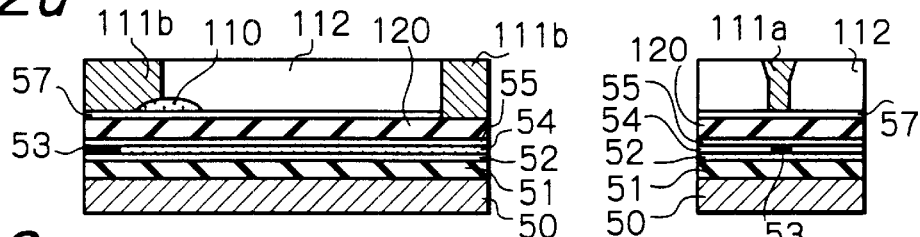

Then, as shown in FIG. 12d, according to this embodiment, without milling into the magnetic layer for the lower magnetic pole 120, a non-magnetic insulation layer 112 is deposited for planarization. Then, Chemical Mechanical Polishing (CMP) is done until the heights of the magnetic pole portion 111a and the back-end yoke portion 111b of the upper magnetic pole reach to a specified value.

Figure 12E:
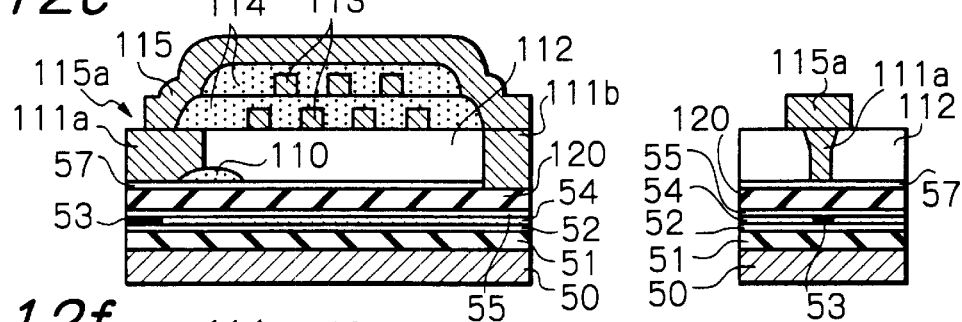
Figure 12F:
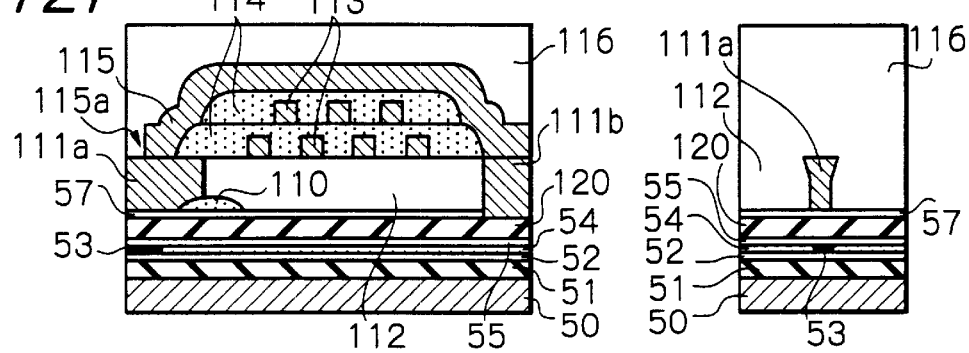

Thereafter, by using the same processes as those in FIGS. 111f and 111g, a coil 113 and an insulation layer 114 for embedding the coil 113 are formed, and a yoke portion 115 of the upper magnetic pole is deposited on the insulation layer 114. Then, pad bumps and others are formed and thereafter a protection layer 63 is deposited. These processes are shown in FIGS. 12e and 12f. As will be noted, in this embodiment, except for having a flattened upper edge of the lower magnetic pole 120 at the side of the recording gap, almost the same processes are implemented as those in the embodiment shown in FIGS. 11a to 11g.

Other structures, operations, advantages and modifications in this embodiment are almost the same as those in the previously described embodiment shown in FIG. 3.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head including a recording head element, said element comprising:

a lower magnetic pole;

a recording gap; and an upper magnetic pole facing to said lower magnetic pole through said recording gap, said upper magnetic pole having a first width which is constant in a region from a first edge of said upper magnetic pole at the side of said recording gap to a point at a predetermined distance from said first edge, and having a second width at a second edge of said upper magnetic pole at the opposite side of said recording gap, said second width being larger than said first width, wherein said first width of the upper magnetic pole is continuously varied from said point to said second edge, wherein an edge of said lower magnetic pole at the side of said recording gap has a protruded part facing to said upper magnetic pole, and wherein said protruded part has a width which is equal to the first width at said first edge of said upper magnetic pole.

2. The thin-film magnetic head as claimed in claim 1, wherein said predetermined distance from said first edge of said upper magnetic pole is equal to or longer than 1 $\mu$m.

3. The thin-film magnetic head as claimed in claim 1, wherein said head further comprises a reproducing head element with a magnetoresistive effect element, said reproducing head element being integrally stacked with said recording head element.

4. A thin-film magnetic head including a recording head element, said element comprising:

a lower magnetic pole;

a recording gap; and an upper magnetic pole facing to said lower magnetic pole through said recording gap, said upper magnetic pole having a first width which is constant in a region from a first edge of said upper magnetic pole at the side of said recording gap to a point at a predetermined distance from said first edge, and having a second width at a second edge of said upper magnetic pole at the opposite side of said recording gap, said second width being larger than said first width, wherein said first width of the upper magnetic pole is continuously varied from said point to said second edge, wherein an edge of said lower magnetic pole at the side of said recording gap is flat.

5. The thin-film magnetic head as claimed in claim 4, wherein said predetermined distance from said first edge of said upper magnetic pole is equal to or longer than 1 $\mu$m.

6. The thin-film magnetic head as claimed in claim 4, wherein said head further comprises a reproducing head element with a magnetoresistive effect element, said reproducing head element being integrally stacked with said recording head element.

* * * * *